US012314250B2

(12) United States Patent
Golbin et al.

(10) Patent No.: US 12,314,250 B2
(45) Date of Patent: *May 27, 2025

(54) IMMUTABLE AND DECENTRALIZED STORAGE OF COMPUTER MODELS

(71) Applicant: PwC Product Sales LLC, New York, NY (US)

(72) Inventors: Ilana Alexandra Golbin, Pasadena, CA (US); Joseph David Voyles, Louisville, KY (US); Kris Douglas Kersey, Pittsburgh, PA (US); Thomas Joseph Foth, Melrose, MA (US)

(73) Assignee: PwC Product Sales LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/313,517

(22) Filed: May 8, 2023

(65) Prior Publication Data
US 2023/0367765 A1  Nov. 16, 2023

Related U.S. Application Data

(63) Continuation of application No. 17/186,748, filed on Feb. 26, 2021, now Pat. No. 11,681,688.
(Continued)

(51) Int. Cl.
*G06F 16/23* (2019.01)
*G06N 20/00* (2019.01)
(Continued)

(52) U.S. Cl.
CPC ......... *G06F 16/2379* (2019.01); *G06N 20/00* (2019.01); *H04L 67/104* (2013.01); *H04L 67/1095* (2013.01); *H04L 67/1097* (2013.01)

(58) Field of Classification Search
CPC ...... G06F 16/2379; G06F 16/23; G06N 20/00
See application file for complete search history.

(56) References Cited

U.S. PATENT DOCUMENTS 10,528,890 B1    1/2020  Boston et al.
2016/0300156 A1* 10/2016  Bowers ............... G06F 16/2465
(Continued)

OTHER PUBLICATIONS

Barber, G. (Sep. 2019). "Artificial Intelligence Confronts a 'Reproducibility' Crisis," located at www.wired.com/story/artificial-intelligence-confronts-reproducibility-crisis/, visited on Oct. 7, 2019. (7 pages).
(Continued)

*Primary Examiner* — Maher N Algibhah
(74) *Attorney, Agent, or Firm* — Morrison & Foerster LLP

(57) ABSTRACT

The present disclosure relates generally to storing computer models, and more specifically to a platform for achieving replicability of a computer model (e.g., a trained machine-learning algorithm) by storing and providing access to data associated with the computer model using an immutable and decentralized ledger system (e.g., a blockchain ledger) and a distributed database. An exemplary computer-enabled method for storing a computer model, the method comprises: receiving data associated with the computer model; generating one or more asset files based on the data associated with the computer model; generating one or more hash values corresponding to the one or more asset files; generating one or more of location trackers corresponding to the one or more asset files; generating a ledger entry comprising the one or more hash values and the one or more location trackers; and adding the ledger entry to a blockchain ledger.

14 Claims, 11 Drawing Sheets

Related U.S. Application Data

(60) Provisional application No. 62/990,044, filed on Mar. 16, 2020.

(51) Int. Cl.
*H04L 67/104* (2022.01)
*H04L 67/1095* (2022.01)
*H04L 67/1097* (2022.01)

(56) References Cited

U.S. PATENT DOCUMENTS

| | | |
|---|---|---|
| 2019/0279107 A1* | 9/2019 | Wang .................... G06N 20/00 |
| 2019/0287027 A1 | 9/2019 | Franceschini et al. |
| 2020/0004855 A1 | 1/2020 | Chepak, Jr. et al. |
| 2020/0027010 A1* | 1/2020 | Lorenc ................. H04L 9/0637 |
| 2020/0050686 A1 | 2/2020 | Kamalapuram et al. |
| 2020/0134083 A1 | 4/2020 | Elliman |
| 2020/0143267 A1 | 5/2020 | Gidney |
| 2020/0169409 A1 | 5/2020 | Herrin et al. |
| 2021/0019661 A1 | 1/2021 | Bos et al. |
| 2021/0081549 A1 | 3/2021 | Trenholm et al. |
| 2022/0012289 A1 | 1/2022 | Ibraheem |
| 2022/0067570 A1 | 3/2022 | Kong et al. |

OTHER PUBLICATIONS

Golbin et al., U.S. Office Action mailed Jun. 14, 2022, directed to U.S. Appl. No. 17/186,748; 22 pages.

International Search Report and Written Opinion mailed Jun. 4, 2021, directed to International Application No. PCT/US2021/019820; 17 pages.

* cited by examiner

300

302
RECEIVING AN INPUT INDICATIVE OF A COMPUTER MODEL

304
BASED ON THE INPUT INDICATIVE OF THE COMPUTER MODEL, OBTAINING AN LEDGER ENTRY, WHEREIN THE LEDGER ENTRY COMPRISES A FIRST PLURALITY OF HASH VALUES AND A PLURALITY OF LOCATION TRACKERS

306
DOWNLOADING A PLURALITY OF ASSET FILES BASED ON THE PLURALITY OF LOCATION TRACKERS

308
BASED ON A LOCATION TRACKER, DOWNLOADING A PLURALITY OF PORTIONS OF AN ASSET FILE; AND
ASSEMBLING THE PORTIONS OF THE ASSET FILE

310
GENERATING A SECOND PLURALITY OF HASH VALUES BASED ON THE PLURALITY OF DOWNLOADED ASSET FILES

312
COMPARING THE FIRST PLURALITY OF HASH VALUES AND THE SECOND PLURALITY OF HASH VALUES

314
PROVIDING AN OUTPUT BASED ON THE COMPARING

502
RECEIVING DATA ASSOCIATED WITH THE COMPUTER MODEL;

504
GENERATING ONE OR MORE ASSET FILES BASED ON THE DATA ASSOCIATED WITH THE COMPUTER MODEL

506
GENERATING ONE OR MORE HASH VALUES CORRESPONDING TO THE ONE OR MORE ASSET FILES

508
GENERATING ONE OR MORE OF LOCATION TRACKERS CORRESPONDING TO THE ONE OR MORE ASSET FILES

510
GENERATING A LEDGER ENTRY COMPRISING THE ONE OR MORE HASH VALUES AND THE ONE OR MORE LOCATION TRACKERS

512
ADDING THE LEDGER ENTRY TO A BLOCKCHAIN LEDGER

522
RECEIVING AN INPUT INDICATIVE OF A COMPUTER MODEL

524
BASED ON THE INPUT INDICATIVE OF THE COMPUTER MODEL, OBTAINING A LEDGER ENTRY, WHEREIN THE LEDGER ENTRY COMPRISES A FIRST SET OF ONE OR MORE HASH VALUES, AND WHEREIN THE LEDGER ENTRY FURTHER COMPRISES ONE OR MORE LOCATION TRACKERS

526
OBTAINING ONE OR MORE ASSET FILES BASED ON THE ONE OR MORE LOCATION TRACKERS

528
GENERATING A SECOND SET OF ONE OR MORE HASH VALUES BASED ON THE OBTAINED ONE OR MORE ASSET FILES

530
COMPARING A FIRST HASH VALUE OF THE FIRST SET AND A SECOND HASH VALUE OF THE SECOND SET

532
PROVIDING A VALIDATION OUTPUT BASED ON THE COMPARING

542
RECEIVING AN INPUT INDICATIVE OF THE COMPUTER MODEL

↓

544
BASED ON THE INPUT INDICATIVE OF THE COMPUTER MODEL, OBTAINING ONE OR MORE ASSET FILES ASSOCIATED WITH THE COMPUTER MODEL USING A BLOCKCHAIN LEDGER

↓

546
RECEIVING AN INPUT INDICATIVE OF A FEEDBACK ASSOCIATED WITH THE COMPUTER MODEL

↓

548
UPDATING THE BLOCKCHAIN LEDGER BASED ON THE FEEDBACK

FIG. 5C

IMMUTABLE AND DECENTRALIZED STORAGE OF COMPUTER MODELS

REFERENCE TO RELATED APPLICATIONS

This application is a continuation of U.S. application Ser. No. 17/186,748, filed Feb. 26, 2021, which claims the benefit of U.S. Provisional Application No. 62/990,044, filed Mar. 16, 2020, the entire contents of each of which is incorporated herein by reference.

FIELD

The present disclosure relates generally to storing computer models, and more specifically to a platform for achieving replicability of a computer model (e.g., a trained machine-learning algorithm) by storing and providing access to data associated with the computer model using an immutable and decentralized ledger system (e.g., a blockchain ledger) and a distributed database.

BACKGROUND

In order to replicate a computer model, a collection of datasets may be needed. For example, in order to replicate a trained machine-learning model, a user may need information related to the training dataset, the testing dataset, the configuration and setup of the model, and the techniques for training the model used by the original developer. Further, in order to verify a performance claim of a computer model (e.g., "X % accuracy in classifying an image set"), a user may need information related to the testing environment and the validation dataset used by the original developer in the experiments.

SUMMARY

Replicating a computer model, such as a trained machine-learning algorithm, can be exceedingly difficult. For example, an academic publication generally provides only high-level information on the design, configuration, and implementation of a machine-learning algorithm. Such high-level information may be insufficient to enable accurate, efficient, and reliable reproduction of the reported experimentation results, because specific details on the setup and configuration of the experiments and the source data are often omitted. For example, an experiment described in a publication can be difficult to replicate due to nuances in the manner in which data is pre-processed and/or the manner in which a model is configured. As another example, the assets that are used to produce a model, such as the training data and the code, are rarely accessible. Even if said assets are accessible, there is no guarantee that the assets available will be of the correct version that was used by the original developer of the reported model.

Thus, unless there is access to the exact assets (e.g., training data, code, computing environment) originally used to produce a machine-learning model, replicating a machine-learning model generally requires extensive experimentation with no guarantee of success.

Accordingly, there is a need for systems and methods for ensuring accurate and reliable access to data needed to replicate a computer model, in order to ensure reproducibility of computer models, particularly machine-learning algorithms.

An exemplary computer-enabled method for storing a computer model, the method comprises: receiving data associated with the computer model; generating one or more asset files based on the data associated with the computer model; generating one or more hash values corresponding to the one or more asset files; generating one or more of location trackers corresponding to the one or more asset files; generating a ledger entry comprising the one or more hash values and the one or more location trackers; and adding the ledger entry to a blockchain ledger.

In some embodiments, the method further comprises distributing each of the one or more asset files based on a corresponding location tracker.

In some embodiments, distributing each of the one or more asset file comprises: generating multiple copies of each of the one or more asset files, and transmitting the multiple copies to multiple nodes in a network for storage.

In some embodiments, the ledger is a distributed ledger, wherein a first copy of the ledger is stored on a first node of a peer-to-peer network, and wherein a second copy of the ledger is stored on a second node of the peer-to-peer network.

In some embodiments, the computer model is a trained machine learning model.

In some embodiments, the one or more asset files comprises a first asset file comprising training data, a second asset file comprising experimentation data, and a third asset file comprising a binary record.

In some embodiments, a location tracker of the one or more location trackers comprises a distribution scheme of a corresponding asset file.

In some embodiments, the distribution scheme indicates locations at which a plurality of copies of the corresponding asset file are stored.

In some embodiments, registering the ledger entry to the blockchain ledger comprises adding the ledger entry to the blockchain ledger.

An exemplary computer-enabled method for retrieving a computer model comprises: receiving an input indicative of a computer model; based on the input indicative of the computer model, obtaining a ledger entry, wherein the ledger entry comprises a first set of one or more hash values, and wherein the ledger entry further comprises one or more location trackers; obtaining one or more asset files based on the one or more location trackers; generating a second set of one or more hash values based on the obtained one or more asset files; comparing a first hash value of the first set and a second hash value of the second set; and providing a validation output based on the comparing.

In some embodiments, the input comprises one or more query terms indicative of the computer model.

In some embodiments, the obtained ledger entry is associated with one or more keywords matching the one or more query terms in the input.

In some embodiments, the method further comprises obtaining an asset file of the one or more asset files by downloading portions of the asset file via a peer-to-peer network and assembling the downloaded portions.

In some embodiments, the method further comprises determining whether the first hash value is identical to the second hash value; in accordance with a determination that the first hash value is not identical to the second hash value, providing an output indicating that an asset file corresponding to the first hash value has been altered.

An exemplary computer-enabled method for providing feedback to a computer model comprises: receiving an input indicative of the computer model; based on the input indicative of the computer model, obtaining one or more asset files associated with the computer model using a blockchain ledger; receiving an input indicative of a feedback associated with the computer model; and updating the blockchain ledger based on the feedback.

In some embodiments, the feedback comprises a performance claim of the computer model.

In some embodiments, the feedback comprises a disagreement with a performance claim of the computer model, wherein the performance claim of the computer model is in the one or more asset files.

An exemplary electronic device comprises: one or more processors; a memory; and one or more programs, wherein the one or more programs are stored in the memory and configured to be executed by the one or more processors, the one or more programs including instructions for: receiving data associated with a computer model; generating one or more asset files based on the data associated with the computer model; generating one or more hash values corresponding to the one or more asset files; generating one or more of location trackers corresponding to the one or more asset files; generating a ledger entry comprising the one or more hash values and the one or more location trackers; and adding the ledger entry to a blockchain ledger.

An exemplary non-transitory computer-readable storage medium stores one or more programs, the one or more programs comprising instructions, which when executed by one or more processors of an electronic device, cause the electronic device to: receive data associated with the computer model; generate one or more asset files based on the data associated with the computer model; generate one or more hash values corresponding to the one or more asset files; generate one or more of location trackers corresponding to the one or more asset files; generate a ledger entry comprising the one or more hash values and the one or more location trackers; and add the ledger entry to a blockchain ledger.

An exemplary electronic device comprises: one or more processors; a memory; and one or more programs, wherein the one or more programs are stored in the memory and configured to be executed by the one or more processors, the one or more programs including instructions for: receiving an input indicative of a computer model; based on the input indicative of the computer model, obtaining a ledger entry, wherein the ledger entry comprises a first set of one or more hash values, and wherein the ledger entry further comprises one or more location trackers; obtaining one or more asset files based on the one or more location trackers; generating a second set of one or more hash values based on the obtained one or more asset files; comparing a first hash value of the first set and a second hash value of the second set; and providing a validation output based on the comparing.

An exemplary non-transitory computer-readable storage medium stores one or more programs, the one or more programs comprising instructions, which when executed by one or more processors of an electronic device, cause the electronic device to receive an input indicative of a computer model; based on the input indicative of the computer model, obtain a ledger entry, wherein the ledger entry comprises a first set of one or more hash values, and wherein the ledger entry further comprises one or more location trackers; obtain one or more asset files based on the one or more location trackers; generate a second set of one or more hash values based on the obtained one or more asset files; compare a first hash value of the first set and a second hash value of the second set; and provide a validation output based on the comparing.

An exemplary electronic device comprises: one or more processors; a memory; and one or more programs, wherein the one or more programs are stored in the memory and configured to be executed by the one or more processors, the one or more programs including instructions for: receiving an input indicative of a computer model; based on the input indicative of the computer model, obtaining one or more asset files associated with the computer model using a blockchain ledger; receiving an input indicative of a feedback associated with the computer model; and updating the blockchain ledger based on the feedback.

An exemplary non-transitory computer-readable storage medium stores one or more programs, the one or more programs comprising instructions, which when executed by one or more processors of an electronic device, cause the electronic device to: receive an input indicative of the computer model; based on the input indicative of the computer model, obtain one or more asset files associated with the computer model using a blockchain ledger; receive an input indicative of a feedback associated with the computer model; and update the blockchain ledger based on the feedback.

BRIEF DESCRIPTION OF THE FIGURES

FIG. 3 illustrates an exemplary process for retrieving a registered computer model, in accordance with some embodiments.

FIG. 5A illustrates an exemplary process, in accordance with some embodiments.

FIG. 5B illustrates an exemplary process, in accordance with some embodiments.

FIG. 5C illustrates an exemplary process, in accordance with some embodiments.

DETAILED DESCRIPTION

Figure 1A:
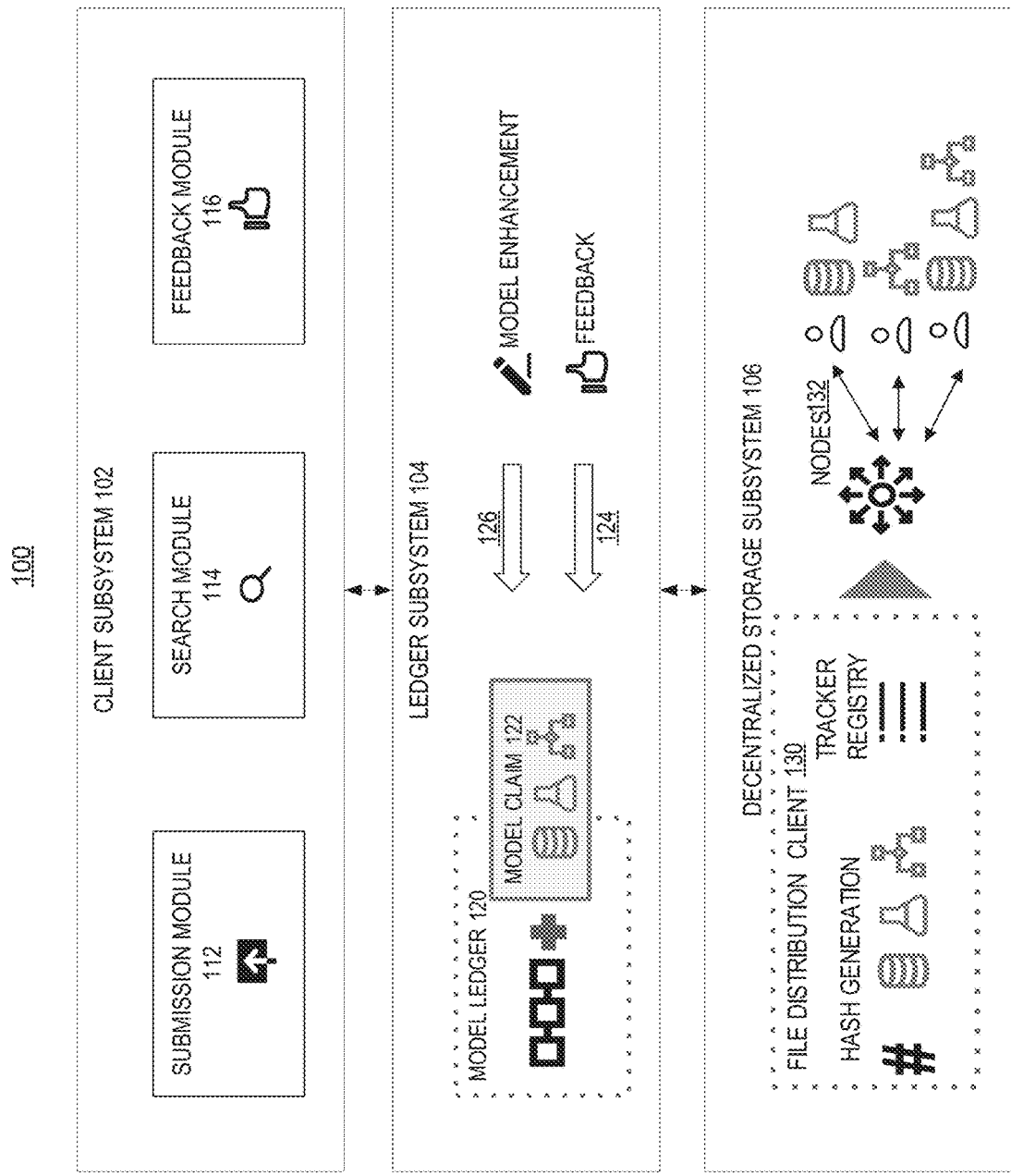
FIG. 1A illustrates an exemplary system for storing and providing access to data needed to replicate one or more computer models, in accordance with some embodiments.

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the various embodiments. Thus, the various embodiments are not intended to be limited to the examples described herein and shown, but are to be accorded the scope consistent with the claims.

The present disclosure is directed to techniques for achieving replicability of one or more computer models by storing and providing access to data associated with the computer models using an immutable and decentralized ledger system (e.g., a blockchain ledger) and a distributed database.

In some embodiments, the one or more computer models comprise trained machine-learning algorithms. In some embodiments, the data associated with a computer model includes a claim of model performance (e.g., "X % accuracy in classifying an image set"), the assets (e.g., training data, code) used to train the computer model or links to such assets, information related to experiment designs or links to such information, or any combination thereof.

In some embodiments, an exemplary system includes a client subsystem, a ledger subsystem, and a storage subsystem. An exemplary client subsystem can provide user interfaces and mechanisms for submitting a computer model, editing (e.g., modifying, adding, correcting) registered computer models, searching for registered computer models, and providing feedback (e.g., validation) with respect to a given registered computer model against its claimed performance. An exemplary ledger system can provide capabilities for versioning and tracking the provenance of a computer model and the underlying data. The ledger system provides transparent record that allows full visibility of who created a computer model, when it was created, and how agreeable the community is with the results. An exemplary storage subsystem can provide distributed storage for the underlying assets, which guarantees persistence and accessibility of the digital assets without reliance on a central authority.

The following description sets forth exemplary methods, parameters, and the like. It should be recognized, however, that such description is not intended as a limitation on the scope of the present disclosure but is instead provided as a description of exemplary embodiments.

Although the following description uses terms "first," "second," etc. to describe various elements, these elements should not be limited by the terms. These terms are only used to distinguish one element from another. For example, a first graphical representation could be termed a second graphical representation, and, similarly, a second graphical representation could be termed a first graphical representation, without departing from the scope of the various described embodiments. The first graphical representation and the second graphical representation are both graphical representations, but they are not the same graphical representation.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

FIG. 1A illustrates an exemplary system 100 for storing and providing access to data needed to replicate one or more computer models, in accordance with some embodiments. The system 100 comprises three subsystems: a client subsystem 102, a ledger subsystem 104, and a decentralized storage subsystem 106.

The client subsystem 102 provides user interfaces and mechanisms for submitting a computer model, editing (e.g., modifying, adding, correcting) registered computer models, searching registered computer models, and providing feedback (e.g., validation) with respect to a given registered computer model against its claimed performance. With reference to FIG. 1A, the client subsystem 102 comprises submission module 112, search module 114, and feedback module 116.

The submission module 112 provides user interfaces and mechanisms for submitting a claim of model performance ("e.g., X % accuracy in classifying an image set") and data associated with the model to be registered with the platform. Exemplary processes for submitting a computer model are described in detail with reference to FIGS. 2A-C. In some embodiments, the user interfaces can trigger backend operations by the ledger subsystem 104 and the storage subsystem 106 (e.g., generating a tracker file, generating hashes, registering the files with a tracker, uploading the files to a node, and/or generating the appropriate transactions to add the assets and model claim to the ledger).

The search module 114 provides user interfaces and mechanism for searching for and retrieving a computer model registered with the platform. Specifically, the search module 114 allows a user to pull a ledger entry/block associated with a given registered computer model and subsequently retrieve the data to replicate the registered computer model. Exemplary processes for searching for and retrieving a computer model are described in detail with reference to FIG. 3.

The feedback module 116 provides user interfaces and mechanisms for providing feedback to a registered computer model. For example, a user can register agreement or disagreement with the claimed performance of the registered model. Exemplary processes for registering feedback to a computer model are described in detail with reference to FIG. 4.

With reference to FIG. 1A, the ledger subsystem 104 provides mechanisms for tracking, versioning, and retrieving a registered computer model. The ledger subsystem 104 can be blockchain-based. The ledger can act as a directed graph that links entities (model claims and user feedback/votes) together as transactions. This provides an ability to create a model lineage and trace enhancements and to track user feedback for each model to establish peer approval (similar to how a peer reviewed journal will sign off that a papers claims are valid). The model claim could be broken into multiple entities: data, code, and documentation such that the lineage for each can be tracked separately, and a new claim against a model can comprise a version of the data set, code, and/or documentation or it can use an existing version of the registered assets Specifically, the ledger comprises a plurality of blocks (i.e., ledger entries). Each block (e.g., block 122) can comprise a timestamp, a hash to the previous block (if the block is not a genesis block), and a payload comprising information for accessing data needed to replicate a registered computer model. Further, feedback associated with a registered computer model can be appended to the ledger entry, as indicated by arrow 124. In some embodiments, the feedback is treated as a new transaction associated with the user that has voted for/against or validated the models claim. The feedback can include a new block that contains a transaction between the model entry and the user in addition to a transaction value (upvote vs downvote). If the user's feedback has a corresponding model claim (arrow 1260), this can also be added back to the ledger as a new block but linked to the original model claim as a transaction.

In some embodiments, each ledger is used to store blocks corresponding to different versions of the same computer model (e.g., versions having different training data, versions having different experiments, versions having different code bases). In some embodiments, different types of computer models can be stored as different blocks on a single ledger.

The blockchain-based ledger subsystem is secured from tampering and revision using hashes. In some embodiments, each block in the ledger comprises the hash of an asset file and information needed access the asset file within the decentralized storage system 106. Changes (e.g., enhancement) made to an asset file can be tracked as a new asset hashed with a pointer on the ledger, as indicated by arrow 126. A new model claim or an enhancement to an existing model can be added as a new block. This new block is explicitly linked to the original model claim to provide traceability (i.e., if a user improves on an existing model A and creates an enhanced model B, outside users should be able to see that Model B is the latest and it is a child of Model A.) Exemplary operations of the ledger subsystem 104 are described below with reference to FIGS. 2A-4.

Figure 1B:
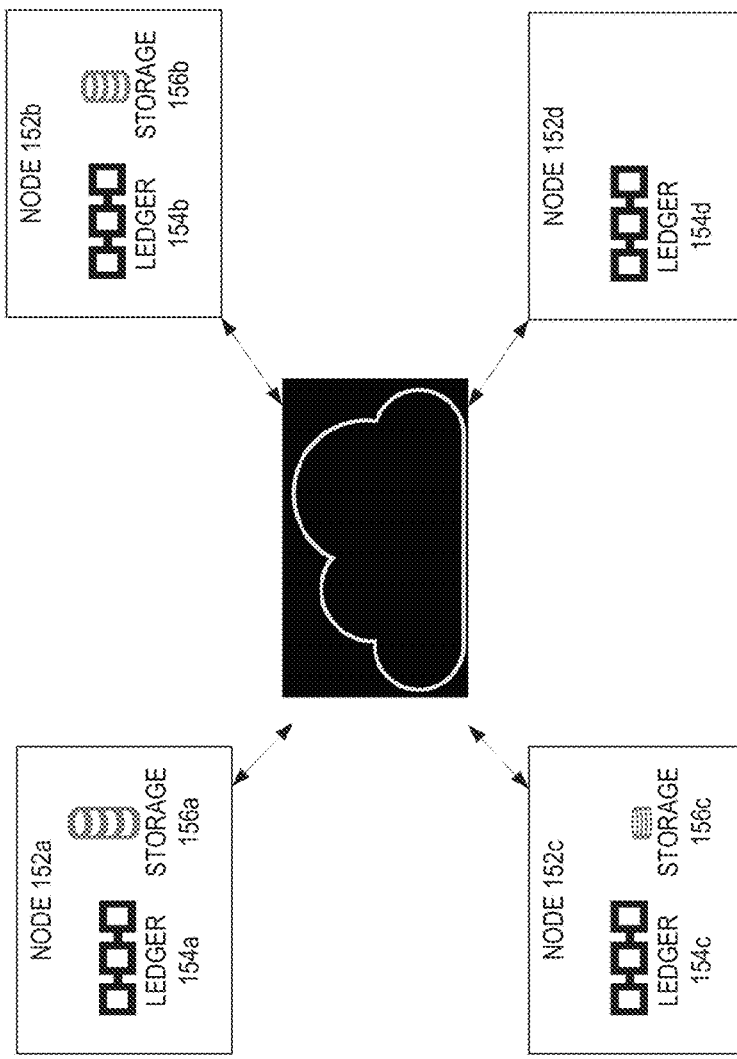
FIG. 1B illustrates an exemplary peer-to-peer network, in accordance with some embodiments.

In some embodiments, the ledger 120 is a distributed ledger. Specifically, the distributed ledger 120 may be maintained through, for example, a "distributed network system", the distributed network system providing decentralized control and storage of the ledger at the one or more entities (which may be considered "nodes" of the network). FIG. 1B depicts an exemplary distributed network system 150 comprising nodes 152a-152d. The number of nodes may be fixed or vary with time. At each node, a copy of a blockchain ledger (e.g., 154a-154d) is stored and maintained. In some embodiments, the nodes can communicate via a peer-to-peer network. The distributed ledger can be updated when modifications to the ledger (e.g., insertion of a ledger entry) are made. The ledger copies 154a-d provide cross-validation with one another in the event of conflicts between ledgers, and various cryptographic and/or hashing algorithms may be utilized during the generation, updating, deletion, linking, and so on, of ledger entries such that ledger entries have increased resiliency to unauthorized tampering or modification.

In some embodiments, each node in the plurality of nodes 152a-d also hosts an instance of the client subsystem 102 such that a user can access functionalities of the client subsystem from the node. Further, the instance of the client subsystem can access the local ledger on the device. In some embodiments, each node is communicatively coupled with one or more subsystems of the system 100. In some embodiments, the nodes 152a-d are a part of a public network. In some embodiments, the nodes 152a-d are a part of private network requiring special permission to join.

With reference to FIG. 1A, the decentralized storage subsystem provides a file sharing solution that allows model data to be stored outside of the module ledger 120 and persisted without being managed by a central authority. To store data associated with a new computer model, the decentralized storage subsystem 106 performs a number of processing operations on the data associated with the new computer model, as described below.

In some embodiments, the decentralized storage subsystem comprises a file distribution client 130. To store asset files corresponding to a new computer model, the file distribution client 130 can create multiple copies of each asset file and store the multiple copies across multiple devices (e.g., nodes 132 in a peer-to-peer network) according to a distribution scheme. In the example depicted in FIG. 1B, two or more copies of an asset file can be generated and stored on two or more of nodes 152a-152c (e.g., via data repositories 156a-c), respectively. The distribution scheme for distributing an asset file can be generated by the file distribution client. In some embodiments, the distribution scheme includes instructions on where (e.g., the multiple nodes) to download an asset file.

Thus, one or more nodes in the network can contain one or more copies of an asset file. In some embodiments, an asset file is not partially stored on a node, such that if a node has a file, it has the entire file. However, a user can download portions of a file from multiple nodes on the network. Thus, the storage is decentralized but files are fully replicated, and retrieval is decentralized but file parts are pulled from more than one node in some embodiments.

It should be appreciated that the nodes hosting the decentralized ledger system can be the same or different from the nodes providing distributed storage of the asset files. In the example depicted in FIG. 1B, the decentralized ledger system resides on nodes 152a-d, while nodes 152a-c provide distributed storage of the asset files. In some embodiments (not illustrated), a node may of the system may host one or more storage media for providing the distributed storage while not hosting a copy of the decentralized ledger.

In some embodiments, the decentralized storage subsystem 106 further generates hash values corresponding to the asset files (e.g., one hash value generated for each asset file) corresponding to the new computer model. The hash values are stored as a part of the model ledger entry. When the asset files are later retrieved from the peer-to-peer nodes, the hash values from the model ledger can be used to validate the asset files (e.g., ensure that the asset files have not been altered at the peer-to-peer nodes). In the example depicted in FIG. 1B, when portions of an asset file are retrieved from the nodes (e.g., nodes 152a-c) at a particular node (e.g., node 152a), the portions are assembled, hashed, and compared with the hash value stored at the local ledger to confirm that the portions had not been tampered with.

It should be appreciated that the storage subsystem 106 can be a centralized storage subsystem, which provides a single address (e.g., a URL) to a file. However, a distributed, peer-to-peer system can increase the likelihood of permanence for the files. If a centralized server storing files is compromised, this would prevent a model claim from being validated by users. A distributed system can increase the likelihood that at least a copy of a file remains in place and no single party is responsible for maintaining a file.

Figure 2A:
FIG. 2A illustrates an exemplary process for registering a computer model to a blockchain-based ledger, in accordance with some embodiments.

FIG. 2A illustrates an exemplary process 200 for registering a computer model to a blockchain-based ledger, according to some embodiments. Process 200 is performed, for example, using one or more electronic devices implementing a software platform. In some examples, process 200 is performed using a client-server system, and the blocks of process 200 are divided up in any manner between the server and a client device. In other examples, the blocks of process 200 are divided up between the server and multiple client devices. Thus, while portions of process 200 are described herein as being performed by particular devices of a client-server system, it will be appreciated that process 200 is not so limited. In other examples, process 200 is performed using multiple client devices. In process 200, some blocks are, optionally, combined, the order of some blocks is, optionally, changed, and some blocks are, optionally, omitted. In some examples, additional steps may be performed in combination with the process 200. Accordingly, the operations as illustrated (and described in greater detail below) are exemplary by nature and, as such, should not be viewed as limiting.

At block 202, an exemplary system (e.g., one or more electronic devices) receives data associated with a computer model. In some embodiments, the data comprises a claim of model performance (e.g., "X % accuracy in classifying an image set"). In some embodiments, the computer model is a trained machine-learning algorithm, and the data comprises the data needed to replicate the trained machine-learning algorithm. The data can be submitted via one or more uploads and one or more manual inputs at an end user device. For example, the client subsystem 102 can be installed on the end user device, and the user can submit the data via the submission module 112. In some embodiments, the end user device is a node in a peer-to-peer network (e.g., nodes 152*a-d* in FIG. 1B).

In some embodiments, the system further allows a user to submit keywords associated with the computer model, such as name of the model, time information of the model, developer of the model, and version of the model. In some embodiments, the system automatically extract the keywords based on the submitted data associated with the computer model. The keywords can be later associated with the ledger entry corresponding to the computer model, such that the ledger entry can be later searched for and retrieved.

Figure 2B:
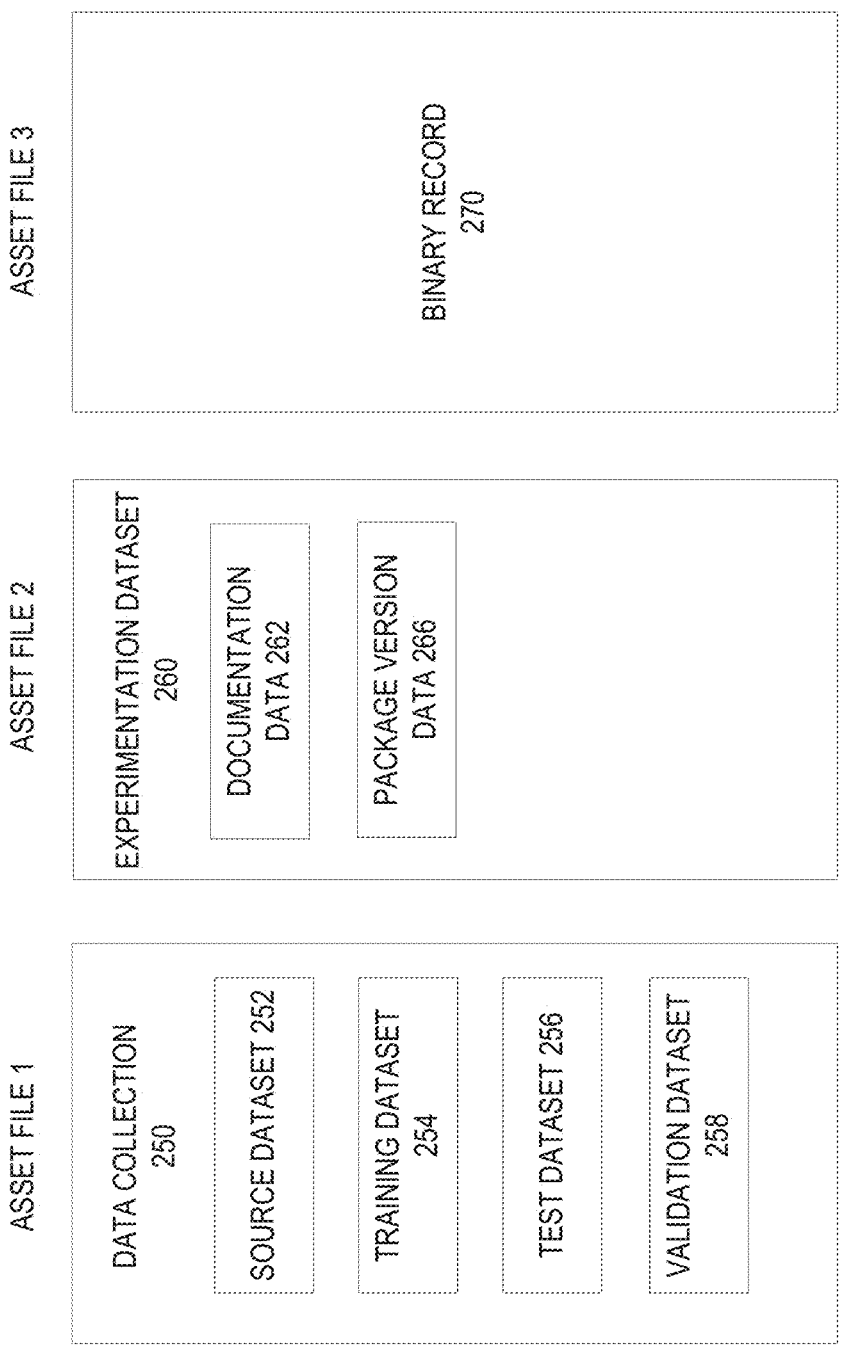
FIG. 2B illustrates an exemplary plurality of asset files, in accordance with some embodiments.

At block 204, the system generates a plurality of asset files based on the data associated with a computer model. FIG. 2B illustrates an exemplary plurality of asset files including data collection 250, experimentation dataset 260, and binary record 270. In some embodiments, the system generates only one asset file based on the data associated with the computer model. In some embodiments, each asset file can include a combination of actual data and pointers to data.

With reference to FIG. 2B, one asset file comprises data collection 250. In some embodiments, the data collection 250 comprises a source dataset 252 used to train the model and support the performance claim of the model. In some embodiments, the source dataset 252 is a superset of training, testing and validation data sets. In some embodiments, one or more of the training, testing, and validation sets are derived from or created from the source dataset 252. In this way, the source dataset 252 may be partitioned into various subset components, such as the training, testing, and validation components. In some embodiments, a larger portion (e.g., a plurality or a majority) of source dataset 252 may a training dataset, and a smaller portion of source dataset 252 (e.g., a significant but small percentage of source dataset 252) may be one or more of a testing dataset and a validation dataset.

The data collection 250 can further comprise a training dataset 254, a test dataset 256, and a validation dataset 258. The training dataset 254 can include data used to train the computer model. For example, the computer model can be a classification model (e.g., a neural network, a Bayes classifier) and is fitted or trained on the training dataset 204 using a supervised learning method.

The training dataset 204 can comprise any input data and the corresponding label(s). For example, the input data can include a set of images, documents, audio files, tabular data, or any combination thereof. In some embodiments, machine learning tasks may require additional metadata as part of the training dataset. As an example, an object detection model can require an image, pixel coordinates that define the location of the objects in the image, and labels for the object in the images.

The validation dataset 256 can include data used to provide an unbiased evaluation of a model fit on the training dataset 204 while tuning the model's hyper-parameters (e.g., the number of hidden units in a neural network) or selecting the best performing approach. The test dataset 208 can include data used to provide an unbiased evaluation of a final model fit.

In some embodiments, the validation dataset is a holdout sample from the superset of data 252. The validation dataset can be the last dataset that is evaluated during a model training process. The reason for including the validation dataset is to assess robustness of the model. Functionally, the validation dataset is the same as train and test. Training and test datasets are used to tune the model. After a model is applied to a validation data set, the standard practice is to call model complete. The training dataset, the test dataset, and the validation dataset are stored separately to ensure experiment reproducibility. Any change to the composition of these data sets can result in a different model validation result.

In some embodiments, the data collection 250 further comprises one or more simulation applications for producing simulated training data. For example, simulation applications can create simulated training data where the actual data is too small or not at the right level of granularity for building a machine learning model. An example includes simulating a population of people with some distribution of characteristics and observing the decisions they make under different conditions. The label and the characteristics of the synthetic population and conditions can then be used as input to a model.

In some embodiments, the data in the data collection 250 can be a derivative of a larger dataset, a database extract, or compiled for a specific purpose. The associated methodologies and tools can also be included. In some embodiments, part of the associated scripts can contain code that can either extract data from an included source data set or it could be used to create a completely new data set using a tool that learns the underlying distributions of the source data. A simulation can also be a game, a market simulation, or any model that emulate a physical or social system. These tools can be used when building reinforcement learning models. For example, a tool include offer a set of simulations for physics problems like a hill climb cart that expose a control. The model training involves operating over that simulation using the control to maximize some objective. The simulation provides and input interface, an underlying model of the system, and a set of outputs to measure performance. Finally, data can be created via a simulated system. One example could be to simulate images and automate the labelling.

In some embodiments, the data in the data collection 250 can include a file or a pointer to file that lists the dependencies and current version of libraries the model.

With reference to FIG. 2B, another asset file comprises experimentation dataset 260. The experimentation dataset 260 comprises documentation data 262, which provides experimentation notes by the original developer, establishes the model intent, defines the code base, and reports results from experiments (e.g., a claim of model performance).

The experimentation dataset 260 can comprise rows of hyper parameters or other tuning features that are explored. For a neural network, this could be an activation function, a learning weight or dropout percentage. The experimentation dataset 260 can also comprise package version data 266, which provides a record of package versions. The experimentation dataset 260, in some embodiments in conjunction with the data collection data 250, can include the model development code, which includes the logic to generate features, define the model, train the model, and validate the model. The code can contain all of the logic needed to develop a trained model (the result being a model binary that can be used for future inference). In addition, this would contain documentation/markup and some inclusion of the code dependencies and versions.

With reference to FIG. 2B, another asset file is the binary record 270. The binary record 270 comprises binary data representing the model structure and the learned functions. In some embodiments, the binary record 270 include a separate code base, from which a user can obtain the computer model and perform inference on new samples. Thus, the computer model restored from the binary record can be used to validate results claimed in the experimentation dataset 260.

At block 206, the system generates a plurality of hash values corresponding to the plurality of asset files. For example, the asset file comprising the data collection 250 can be processed in accordance with a hashing algorithm to obtain a first hash value; the asset file comprising the experimentation dataset 260 can be processed in accordance with a hashing algorithm to obtain a second hash value; the asset file comprising the data collection 270 can be processed in accordance with a hashing algorithm to obtain a third hash value.

At block 208, the system generates a plurality of location trackers corresponding to the plurality of asset files. In some embodiments, each asset file can stored in a distributed manner over a network (e.g., over multiple nodes in a peer-to-peer network). For example, with reference to FIG. 1B, multiple copies of a single asset file can be generated and stored across two or more of nodes 152a-c. To access such an asset file at a later time from a device, portions of the asset files residing on the nodes are transmitted to the device and reassembled into a full copy of the asset file. In some embodiments, for each asset file, the system generates a distribution scheme specifying which nodes on which copies of the asset file reside. Each location tracker comprises the distribution scheme or a pointer to the distribution scheme. In some embodiments, a location tracker can comprise a token.

Figure 2C:
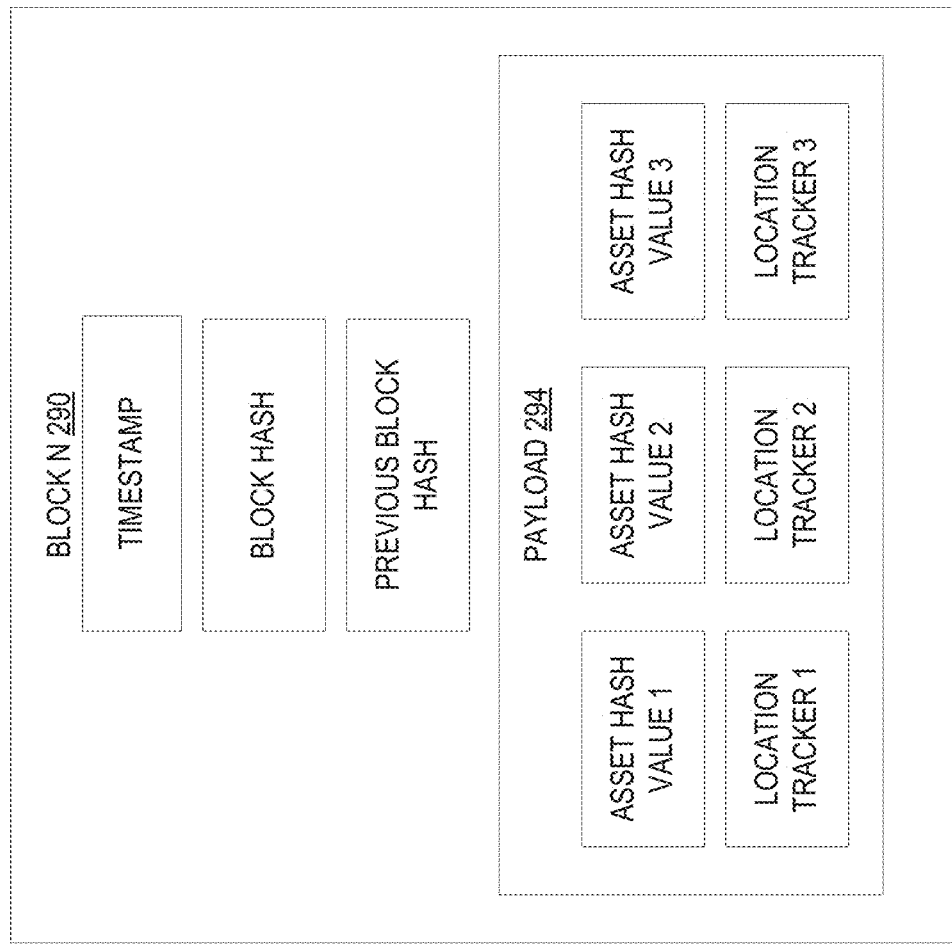
FIG. 2C illustrates an exemplary block or ledger entry, in accordance with some embodiments.

At block 210, the system generates a data package comprising the plurality of hash values and the plurality of location trackers; at block 212, the system registers (or adds) a block corresponding to the package to a blockchain ledger. FIG. 2C illustrates an exemplary block 290 corresponding to a data package comprising hash values and location trackers. As depicted, the block comprises a plurality (e.g., 3) of hash values and a plurality (e.g., 3) of location trackers in its payload 294. For example, hash value 1 is the hash value generated based on a first asset file (e.g., asset file 1 in FIG. 2B) and location tracker 1 comprises the distribution scheme for the first asset file.

In some embodiments, a model claim (data, code, model) could be a composite of separate entries and each entry comprises a file and a location tracker and the entries are linked together as a transaction that represents the model claim. In this case, the ingredients to a model claim are individually added to the ledger and the claim itself becomes a transaction that unifies the ingredients. In this scenario, each of the ingredients can evolve individually to support other model claims or support updates to the parent claim.

With reference to FIG. 2C, the block further comprises a timestamp for indicating a time associated with the computer model (e.g., time of upload, time of block generation). The block can further comprise a block hash, which is generated in accordance with a hashing algorithm based on the payload 294. The block 290 can comprise a hash corresponding to a previous block, if the block 290 is not a genesis block.

At block 214, the system distributes the plurality of asset files in accordance with the plurality of location trackers. Specifically, based on the corresponding distribution scheme, the system generates multiple copies of an asset file and transmit the multiple copies to multiple peer-to-peer nodes, respectively, for storage.

In some embodiments, the system compares a newly generated hash value for a new asset file with hash values in an existing ledger. If the newly generated hash value is identical to one of the hash values in the existing ledger, it is an indication that the new asset file is identical to a previously uploaded and hashed asset file for another computer model. In order to avoid uploading duplicative datasets, the system can forego uploading the new asset file and include the location tracker associated with the previous asset file in the new block/ledger entry.

At block 216, the system distributes the blockchain ledger. If the blockchain ledger is newly generated, copies of the blockchain ledger can be distributed to different nodes in a peer-to-peer network. If the blockchain ledger is merely updated (e.g., by insertion of a new block), the copies of the blockchain ledger at different nodes can be updated accordingly. Keywords can be associated with the ledger entry associated with the computer model, such that the ledger entry can be later searched for and retrieved.

In some embodiments, the peer-to-peer network for storing the asset files and the peer-to-peer network for storing copies of the distributed ledger overlap. In some embodiments, the two peer-to-peer networks do not overlap.

The process 200 can be performed by a device hosting one or more components of the system 100. In some embodiments, the device is one of the nodes in a peer-to-peer network (e.g., nodes 152a-d of FIG. 1B). In some embodiments, the device is communicatively coupled with one of the nodes.

FIG. 3 illustrates an exemplary process 300 for retrieving a registered computer model, in accordance with some embodiments. Process 300 is performed, for example, using one or more electronic devices implementing a software platform. In some examples, process 300 is performed using a client-server system, and the blocks of process 300 are divided up in any manner between the server and a client device. In other examples, the blocks of process 300 are divided up between the server and multiple client devices. Thus, while portions of process 300 are described herein as being performed by particular devices of a client-server system, it will be appreciated that process 300 is not so limited. In other examples, process 300 is performed using multiple client devices. In process 300, some blocks are, optionally, combined, the order of some blocks is, optionally, changed, and some blocks are, optionally, omitted. In some examples, additional steps may be performed in combination with the process 300. Accordingly, the operations as illustrated (and described in greater detail below) are exemplary by nature and, as such, should not be viewed as limiting.

At block 302, an exemplary system (e.g., one or more electronic devices) receives an input indicative of a computer model. In some embodiments, the input comprises one or more query terms or keywords associated with a registered computer model, such as name of the model, time information of the model, developer of the model, and version of the model.

At block 304, the system, based on the input indicative of the computer model, obtains a ledger entry, wherein the ledger entry comprises a first plurality of hash values and a plurality of location trackers. In some embodiments, based on the input indicative of the computer model, the system identifies a ledger entry that is associated with keywords matching the input. In some embodiments, the ledger is a blockchain-based system, and the ledger entry is a block in the blockchain.

In some embodiments, the first plurality of hash values are associated with a plurality asset files of the computer model. For example, each downloaded asset file corresponds to a hash value in the first plurality of hash values. Further, the plurality of location trackers are associated with the plurality asset files. For example, each location tracker comprises a distribution scheme for retrieving an asset file.

At block 306, the system downloads a plurality of asset files based on the plurality of location trackers. In some embodiments, as shown in block 308, the system, based on a location tracker, download a plurality of portions of an asset file (e.g., from one or more of nodes in nodes 152a-c in FIG. 1B), and assembles the portions of the asset file.

At block 310, the system generates a second plurality of hash values based on the plurality of downloaded asset files. For example, the system hashes each asset file according to a hashing algorithm to generate a hash value of the second plurality of hash values.

At block 312, the system compares the first plurality of hash values and the second plurality of hash values. If the downloaded asset files have not been altered from when the asset files are submitted (i.e., when the first plurality of hash values are generated), then the first plurality and the second plurality of hash values would be identical. Accordingly, if the system detects an inconsistency between the first plurality of hash values and the second plurality of hash values, one or more of the asset files have been altered. By identifying the hash value that has changed, the system can identify which asset file has been altered.

At block 314, the system provides an output based on the comparing. In some embodiments, the system provides an output (graphical, audio, textual) indicating that the asset files of the computer model has been tampered with. In some embodiments, the system provides an output (graphical, audio, textual) indicating the particular asset file that has been tampered with.

The process 300 can be performed by a device hosting one or more components of the system 100. In some embodiments, the device is one of the nodes in a peer-to-peer network (e.g., nodes 152a-d of FIG. 1B). In some embodiments, the device is communicatively coupled with one of the nodes.

Figure 4:
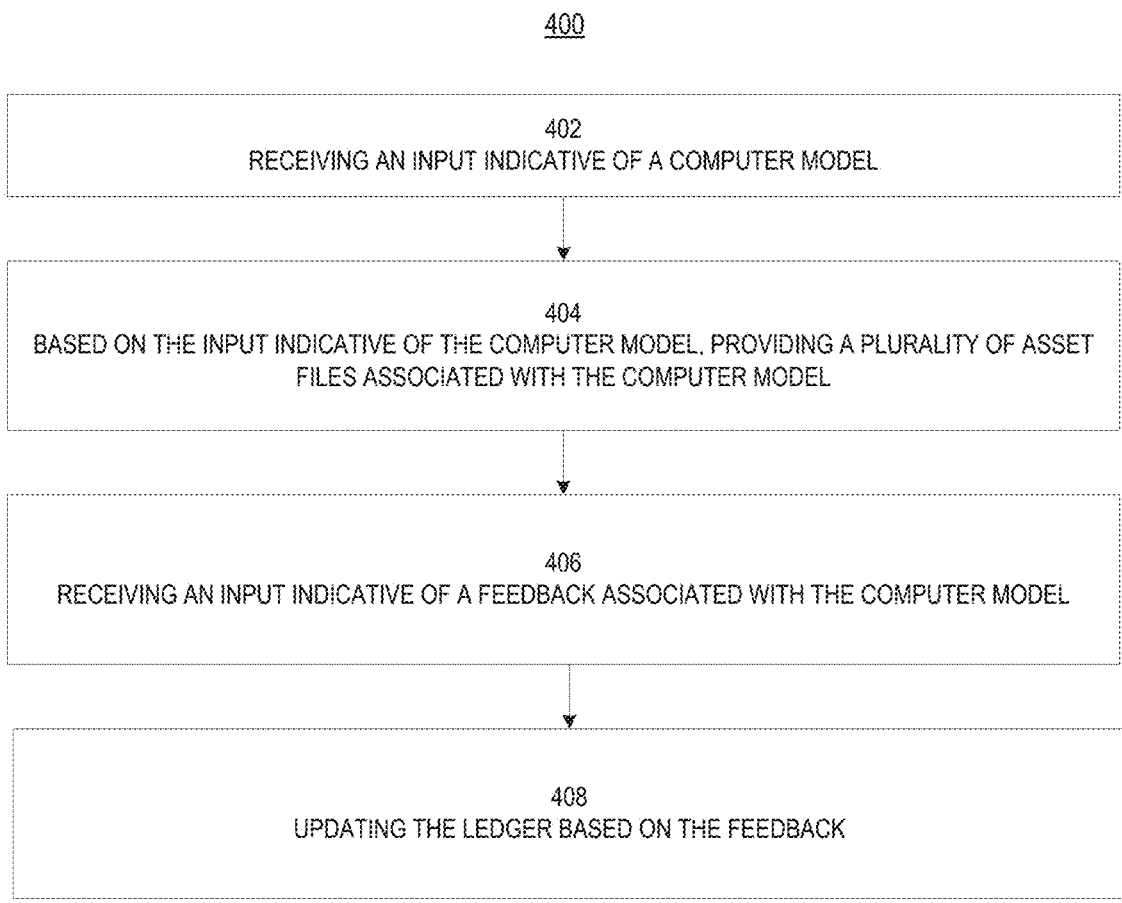
FIG. 4 illustrates an exemplary process for providing feedback to a registered computer model, in accordance with some embodiments.

FIG. 4 illustrates an exemplary process 400 for providing feedback to a registered computer model, in accordance with some embodiments. Process 400 is performed, for example, using one or more electronic devices implementing a software platform. In some examples, process 400 is performed using a client-server system, and the blocks of process 400 are divided up in any manner between the server and a client device. In other examples, the blocks of process 400 are divided up between the server and multiple client devices. Thus, while portions of process 400 are described herein as being performed by particular devices of a client-server system, it will be appreciated that process 400 is not so limited. In other examples, process 400 is performed using multiple client devices. In process 400, some blocks are, optionally, combined, the order of some blocks is, optionally, changed, and some blocks are, optionally, omitted. In some examples, additional steps may be performed in combination with the process 400. Accordingly, the operations as illustrated (and described in greater detail below) are exemplary by nature and, as such, should not be viewed as limiting.

At block 402, an exemplary system (e.g., one or more electronic devices) receives an input indicative of a computer model. In some embodiments, the input comprises one or more query terms associated with a registered computer model, such as name of the model, time information of the model, developer of the model, and version of the model.

At block 404, the system, based on the input indicative of the computer model, provides a plurality of asset files associated with the computer model. In some embodiments, the system obtains the plurality of asset files according to the process 300 described above. In some embodiments, the system provides one or more user interfaces for viewing and accessing the asset files.

At block 406, the system receives an input indicative of a feedback associated with the computer model. In some embodiments, the feedback is a validation feedback indicating that a user was able to achieve a claimed model performance using the asset files. In some embodiments, the feedback is an invalidation feedback indicating that the user was not able achieve the claimed model performance. In some embodiments, the feedback includes one or more comments by the user (e.g., the user's claim of model performance).

At block 408, the system updates the ledger based on the feedback. In some embodiments, the feedback is treated as a new transaction associated with the user that has voted for/against or validated the models claim. The feedback can include a new block that contains a transaction between the model entry and the user in addition to a transaction value (upvote vs downvote). If the user's feedback has a corresponding model claim (arrow 1260), this can also be added back to the ledger as a new block but linked to the original model claim as a transaction.

The process 400 can be performed by a device hosting one or more components of the system 100. In some embodiments, the device is one of the nodes in a peer-to-peer network (e.g., nodes 152a-d of FIG. 1B). In some embodiments, the device is communicatively coupled with one of the nodes.

FIG. 5A illustrates process 500 for storing a computer model, according to various examples. Process 500 is performed, for example, using one or more electronic devices implementing a software platform. In some examples, process 500 is performed using a client-server system, and the blocks of process 500 are divided up in any manner between the server and a client device. In other examples, the blocks of process 500 are divided up between the server and multiple client devices. Thus, while portions of process 500 are described herein as being performed by particular devices of a client-server system, it will be appreciated that process 500 is not so limited. In other examples, process 500 is performed using only a client device or only multiple client devices. In process 500, some blocks are, optionally, combined, the order of some blocks is, optionally, changed, and some blocks are, optionally, omitted. In some examples, additional steps may be performed in combination with the process 500. Accordingly, the operations as illustrated (and described in greater detail below) are exemplary by nature and, as such, should not be viewed as limiting.

At block 502, an exemplary system (e.g., one or more electronic devices) receives data associated with the computer model; at block 504, the system generates one or more asset files based on the data associated with the computer model; at block 506, the system generates one or more hash values corresponding to the one or more asset files; at block 508, the system generates one or more of location trackers corresponding to the one or more asset files; at block 510, the system generates a ledger entry comprising the one or more hash values and the one or more location trackers; and at block 512, the system adds the ledger entry to a blockchain ledger.

FIG. 5B illustrates process 520 for retrieving a computer model, according to various examples. Process 520 is performed, for example, using one or more electronic devices implementing a software platform. In some examples, process 520 is performed using a client-server system, and the blocks of process 520 are divided up in any manner between the server and a client device. In other examples, the blocks of process 520 are divided up between the server and multiple client devices. Thus, while portions of process 520 are described herein as being performed by particular devices of a client-server system, it will be appreciated that process 520 is not so limited. In other examples, process 520 is performed using only a client device or only multiple client devices. In process 520, some blocks are, optionally, combined, the order of some blocks is, optionally, changed, and some blocks are, optionally, omitted. In some examples, additional steps may be performed in combination with the process 520. Accordingly, the operations as illustrated (and described in greater detail below) are exemplary by nature and, as such, should not be viewed as limiting.

At block 522, an exemplary system (e.g., one or more electronic devices) receives an input indicative of a computer model; at block 525, the system, based on the input indicative of the computer model, obtains a ledger entry, wherein the ledger entry comprises a first set of one or more hash values, and wherein the ledger entry further comprises one or more location trackers; at block 526, the system obtains one or more asset files based on the one or more location trackers; at block 528, the system generates a second set of one or more hash values based on the obtained one or more asset files; at block 530, the system compares a first hash value of the first set and a second hash value of the second set; and at block 532, the system provides a validation output based on the comparing.

FIG. 5C illustrates process 540 for providing feedback to a computer model, according to various examples. Process 540 is performed, for example, using one or more electronic devices implementing a software platform. In some examples, process 540 is performed using a client-server system, and the blocks of process 540 are divided up in any manner between the server and a client device. In other examples, the blocks of process 540 are divided up between the server and multiple client devices. Thus, while portions of process 540 are described herein as being performed by particular devices of a client-server system, it will be appreciated that process 540 is not so limited. In other examples, process 540 is performed using only a client device or only multiple client devices. In process 540, some blocks are, optionally, combined, the order of some blocks is, optionally, changed, and some blocks are, optionally, omitted. In some examples, additional steps may be performed in combination with the process 540. Accordingly, the operations as illustrated (and described in greater detail below) are exemplary by nature and, as such, should not be viewed as limiting.

At block 542, an exemplary system (e.g., one or more electronic devices) receives an input indicative of the computer model; at block 544, the system, based on the input indicative of the computer model, obtains one or more asset files associated with the computer model using a blockchain ledger; at block 546, the system receives an input indicative of a feedback associated with the computer model; and at block 548, the system updates the blockchain ledger based on the feedback.

Figure 6:
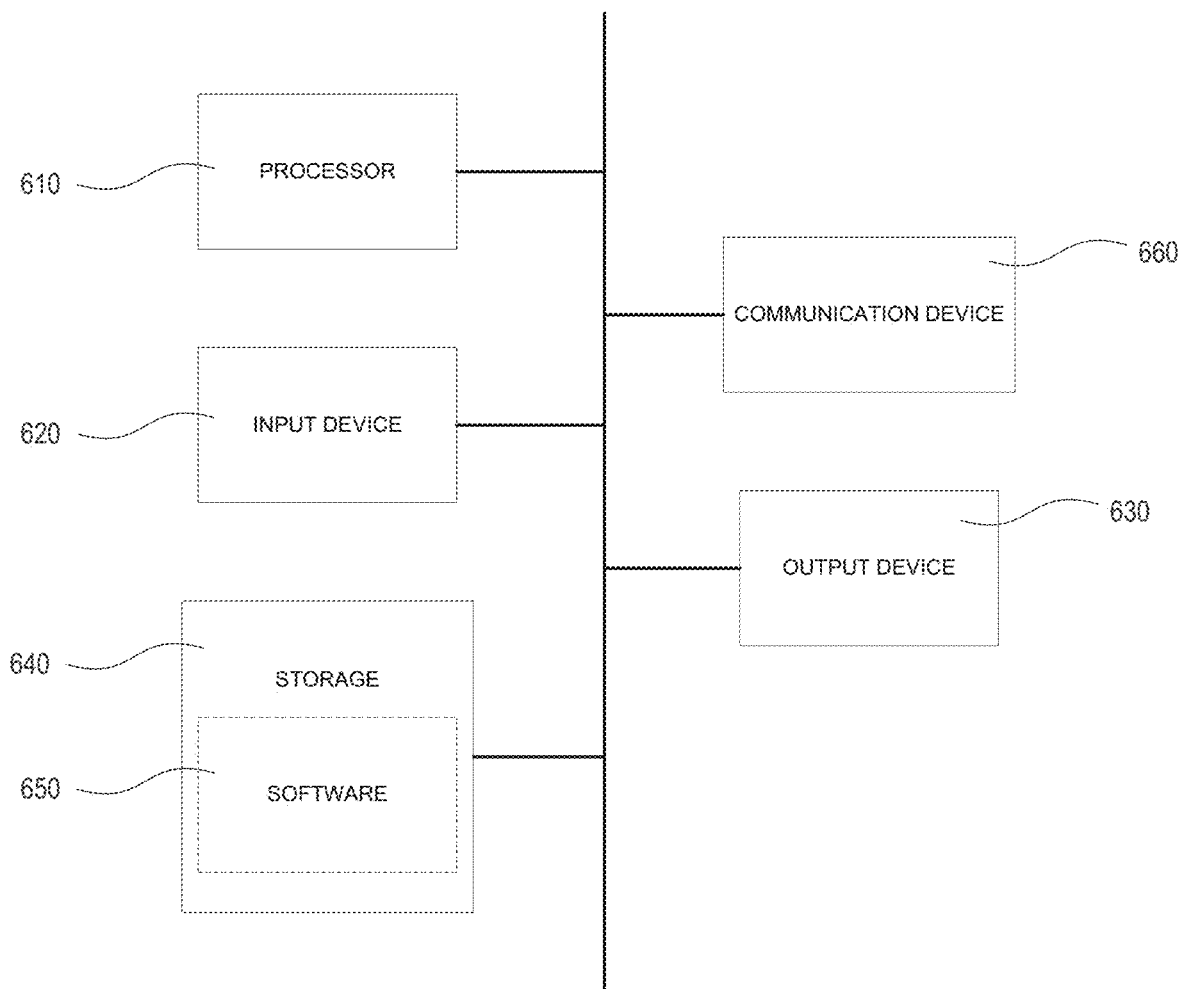
FIG. 6 depicts an exemplary electronic device, in accordance with some embodiments.

FIG. 6 illustrates an example of a computing device in accordance with one embodiment. Device 600 can be a host computer connected to a network. Device 600 can be a client computer or a server. As shown in FIG. 6, device 600 can be any suitable type of microprocessor-based device, such as a personal computer, workstation, server or handheld computing device (portable electronic device) such as a phone or tablet. The device can include, for example, one or more of processor 610, input device 620, output device 630, storage 640, and communication device 660. Input device 620 and output device 630 can generally correspond to those described above, and can either be connectable or integrated with the computer.

Input device 620 can be any suitable device that provides input, such as a touch screen, keyboard or keypad, mouse, or voice-recognition device. Output device 630 can be any suitable device that provides output, such as a touch screen, haptics device, or speaker.

Storage 640 can be any suitable device that provides storage, such as an electrical, magnetic or optical memory including a RAM, cache, hard drive, or removable storage disk. Communication device 660 can include any suitable device capable of transmitting and receiving signals over a network, such as a network interface chip or device. The components of the computer can be connected in any suitable manner, such as via a physical bus or wirelessly.

Software 650, which can be stored in storage 640 and executed by processor 610, can include, for example, the programming that embodies the functionality of the present disclosure (e.g., as embodied in the devices as described above).

Software 650 can also be stored and/or transported within any non-transitory computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 640, that can contain or store programming for use by or in connection with an instruction execution system, apparatus, or device.

Software 650 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate or transport programming for use by or in connection with an instruction execution system, apparatus, or device. The transport readable medium can include, but is not limited to, an electronic, magnetic, optical, electromagnetic or infrared wired or wireless propagation medium.

Device 600 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Device 600 can implement any operating system suitable for operating on the network. Software 650 can be written in any suitable programming language, such as C, C++, Java or Python. In various embodiments, application software embodying the functionality of the present disclosure can be deployed in different configurations, such as in a client/server arrangement or through a Web browser as a Web-based application or Web service, for example.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

What is claimed is:

1. A computer-enabled method for providing feedback regarding a computer model, comprising:
obtaining a plurality of asset files associated with a computer model using a blockchain ledger that is distributed across one or more nodes in a network system, wherein the plurality of asset files comprise a first version of a source data set, a first version of experimentation data, and a first version of a model structure of the computer model, wherein obtaining the plurality of asset files comprises:
identifying a ledger entry in the blockchain ledger based on data associated with the computer model, wherein the ledger entry comprises a plurality of location trackers, wherein each location tracker of the plurality of location trackers is associated with an asset file of the plurality of asset files, and
for each asset file of the plurality of asset files, downloading, from the one or more nodes in the network system, based on the respective location tracker of the plurality of location trackers, one or more portions of the asset file;
receiving an input indicative of a feedback associated with the computer model; and
updating the blockchain ledger based on the feedback.

2. The method of claim 1, wherein the input indicative of feedback comprises a claim indicating performance of the model.

3. The method of claim 1, wherein the input indicative of feedback comprises an enhanced version of the model.

4. The method of claim 1, wherein the input indicative of feedback comprises an indication of agreement or disagreement with a claimed performance of the computer model.

5. The method of claim 1, wherein the input indicative of feedback comprises an indication of one or more selected from a group consisting of: a second version of the source data set different from the first version of the source data set, a second version of the experimentation data different from the first version of the experimentation data, and a second version of the model structure different from the first version of the model structure.

6. The method of claim 1, wherein the input indicative of feedback comprises an indication of one or more selected from a group consisting of: the first version of a source data set, the first version of experimentation data, and the first version of a model structure.

7. The method of claim 1, wherein updating the blockchain ledger based on the feedback comprises adding a new block to the blockchain ledger, wherein the new block is linked to an indication of the computer model on the blockchain ledger.

8. The method of claim 7, wherein updating the blockchain ledger comprises storing an indication on the ledger that the new block represents a child version of the computer model.

9. The method of claim 1, wherein a location tracker of the plurality of location trackers comprises a distribution scheme of a corresponding asset file of the plurality of asset files.

10. The method of claim 9, wherein the distribution scheme indicates locations at which a plurality of copies of the corresponding asset file are stored.

11. The method of claim 1, wherein the ledger is a distributed ledger, wherein a first copy of the ledger is stored on a first node of a peer-to-peer network, and wherein a second copy of the ledger is stored on a second node of the peer-to-peer network.

12. The method of claim 1, wherein the computer model is a trained machine learning model.

13. A system for providing feedback regarding a computer model, the system comprising one or more processors configured to:
obtain a plurality of asset files associated with a computer model using a blockchain ledger that is distributed across one or more nodes in a network system, wherein the plurality of asset files comprise a first version of a source data set, a first version of experimentation data, and a first version of a model structure of the computer model, wherein obtaining the plurality of asset files comprises:
identifying a ledger entry in the blockchain ledger based on data associated with the computer model, wherein the ledger entry comprises a plurality of location trackers, wherein each location tracker of the plurality of location trackers is associated with an asset file of the plurality of asset files, and
for each asset file of the plurality of asset files, downloading, from the one or more nodes in the network system, based on the respective location tracker of the plurality of location trackers, one or more portions of the asset file;
receive an input indicative of a feedback associated with the computer model; and
update the blockchain ledger based on the feedback.

14. A non-transitory computer-readable storage medium storing instructions for providing feedback regarding a computer model, the instructions configured to be executed by one or more processors of a system to cause the system to:
- obtain a plurality of asset files associated with a computer model using a blockchain ledger that is distributed across one or more nodes in a network system, wherein the plurality of asset files comprise a first version of a source data set, a first version of experimentation data, and a first version of a model structure of the computer model, wherein obtaining the plurality of asset files comprises:
  - identifying a ledger entry in the blockchain ledger based on data associated with the computer model, wherein the ledger entry comprises a plurality of location trackers, wherein each location tracker of the plurality of location trackers is associated with an asset file of the plurality of asset files, and
  - for each asset file of the plurality of asset files, downloading, from the one or more nodes in the network system, based on the respective location tracker of the plurality of location trackers, one or more portions of the asset file;
- receive an input indicative of a feedback associated with the computer model; and
- update the blockchain ledger based on the feedback.

* * * * *